Feb. 27, 1968
C. R. BISHOP
3,370,667
DRIVE ARRANGEMENT FOR VEHICLES WITH TORSION-FREE
ARTICULATED SUSPENSIONS
Original Filed Dec. 14, 1964
3 Sheets-Sheet 1
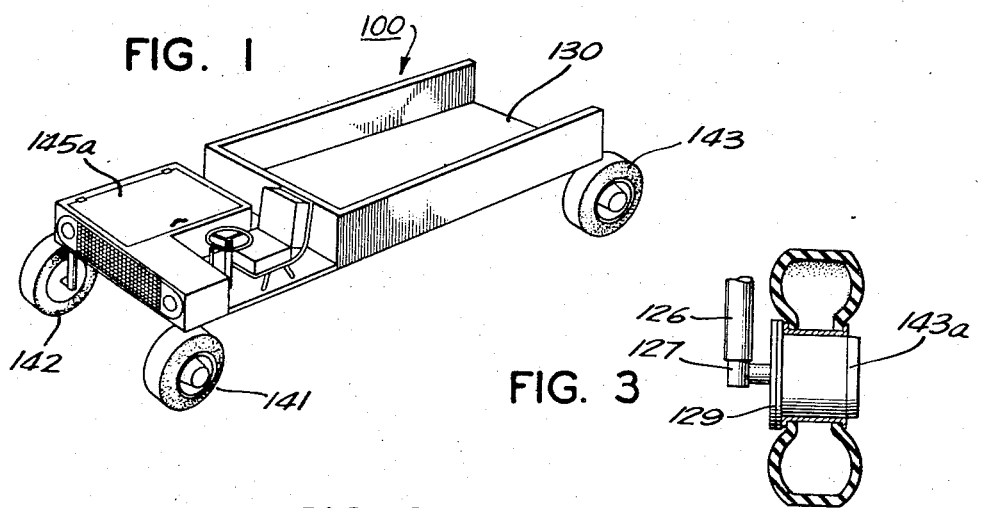
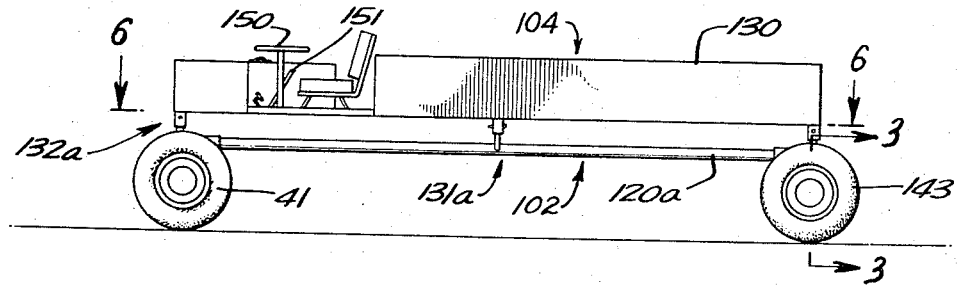
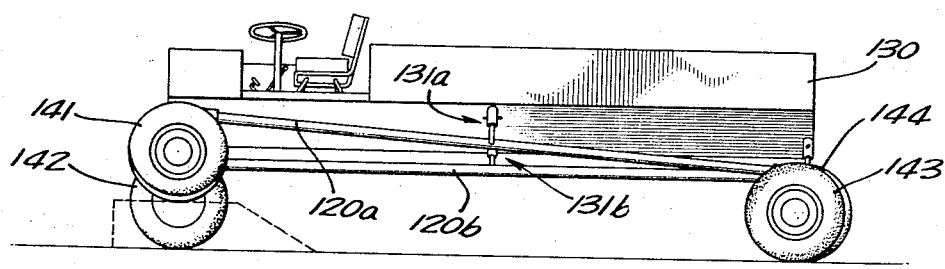
INVENTOR.
CHARLES R. BISHOP
BY HIS EXECUTRIX
MURIEL J. BISHOP
BY Beehler & Arant
ATTORNEYS Feb. 27, 1968 C. R. BISHOP 3,370,667
DRIVE ARRANGEMENT FOR VEHICLES WITH TORSION-FREE
ARTICULATED SUSPENSIONS
Original Filed Dec. 14, 1964 3 Sheets-Sheet 2
FIG. 5
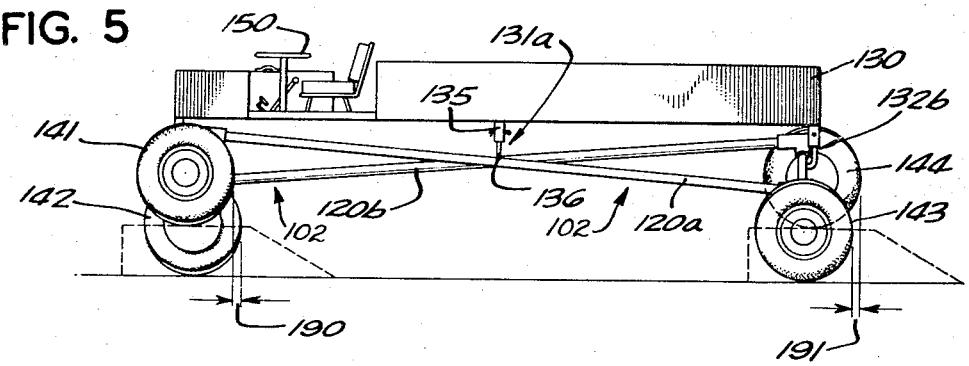
FIG. 6
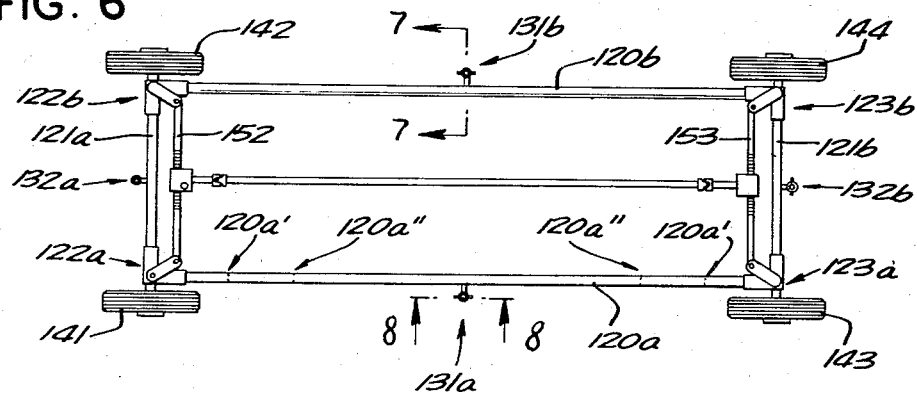
FIG. 7
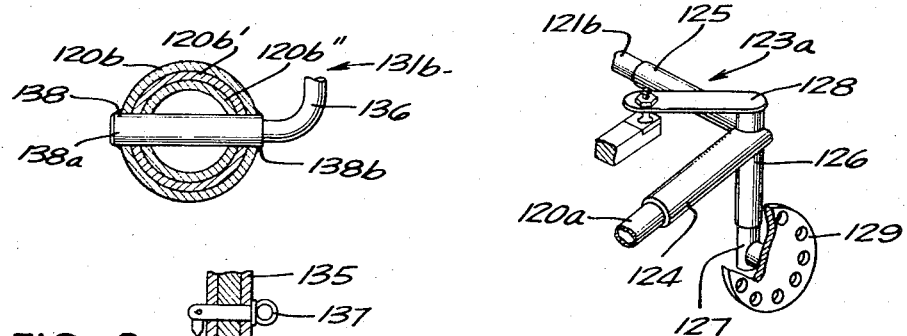
FIG. 8
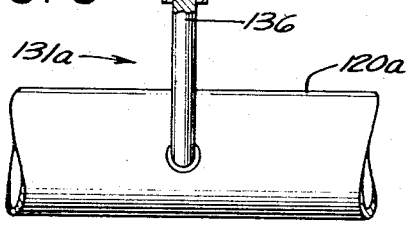
FIG. 9
INVENTOR.
CHARLES R. BISHOP
BY HIS EXECUTRIX
MURIEL J. BISHOP
BY Beehler & Arant
ATTORNEYS United States Patent Office 3,370,667
Patented Feb. 27, 1968

1

3,370,667
DRIVE ARRANGEMENT FOR VEHICLES WITH
TORSION-FREE ARTICULATED SUSPENSIONS
Charles Richard Bishop, deceased, late of Garden Grove,
Calif., by Muriel Janet Bishop, executrix, 10342 Hill
Road, Garden Grove, Calif. 92640
Original application Dec. 14, 1964, Ser. No. 418,167, now
Patent No. 3,266,815, dated Aug. 16, 1966. Divided and
this application Apr. 12, 1966, Ser. No. 542,092
5 Claims. (Cl. 180—45)

ABSTRACT OF THE DISCLOSURE

A powered vehicle having a rigid main frame; an articulating frame including a pair of side members which are pivotally attached to the main frame along a transverse axis at the longitudinal center of the main frame, a pair of end members which are pivotally attached to the main frame along the longitudinal central axis of the main frame, and pivotal corner connections of the end members to the side members; supporting wheels carried by respective corners of the articulating frame so that the weight of the vehicle and its load are at all times evenly distributed amongst the four wheels; a separate drive motor associated with each of the wheels; and differential drive means coupled to all four of the motors so as to supply energy to each wheel in accordance with its requirements; with the result that the vehicle is capable of climbing vertical obstacles, one wheel at a time.

Background of the invention

This application is a division of copending application Ser. No. 418,167, filed Dec. 14, 1964, now Patent No. 3,266,815, and entitled Torsion Free Articulated Vehicle Suspension.

The present invention relates generally to self-propelled vehicles and, more particularly, to a novel drive arrangement for wheeled vehicles with articulated suspensions of the kind disclosed in the aforementioned copending application.

The aforementioned copending application discloses vehicles having an articulated suspension which is effective to equalize the load on the vehicle wheels and to minimize or eliminate torsional stress in the vehicle chassis as well as in a pay load supported on the chassis, particularly during movement of the vehicles over rough or uneven terrain. Briefly, the vehicles disclosed in the copending application comprise a generally rectangular articulated or flexible frame having a pair of longitudinally extending side members, a pair of transversely extending end members, and a pivotal connection at each corner of the frame between the adjacent side and end members. These pivotal connections between the side and end members adapt the frame for articulation involving simultaneous pivoting of the side members in opposite directions about a common central transverse pivot axis of the frame and simultaneous pivoting of the end members in opposite directions above a common central longitudinal axis of the frame. Cooperatively associated with the flexible frame is a rigid frame which is pivotally connected to the longitudinal centers of the side end members, respectively, for pivoting of these members relative to the rigid frame on their respective transverse and longitudinal pivot axes. Rotatably mounted on the four corners of the flexible frame are ground engaging wheels which support the frames for longitudinal movement along the ground.

The arrangement of this vehicle suspension is such that each wheel is permitted to move vertically relative to the remaining wheels. Accordingly, during movement of the vehicle over rough or uneven terrain, the four vehicle wheels move up and down effectively independently of one another in accordance with the contour of the terrain. One advantage of the suspension resides in the fact that such independent vertical movement of the wheels occasions simple pivotal movement of the side and end members of the flexible frame relative to the rigid frame without imparting torsional or bending stresses to the rigid frame or to a pay load supported thereon. An additional, highly important advantage of the suspension with which the present invention is more directly concerned, resides in the fact that the points of pivotal attachment of the flexible frame to the rigid frame are located midway between the vehicle wheels. Accordingly, the loading on these wheels is substantially equalized at all times.

It is a principal object of the present invention to provide a novel drive arrangement for wheeled vehicles of the class described.

A more specific object of the invention is to provide a drive arrangement for wheeled vehicles of the class described, wherein the vehicle wheels are independently driven in such a way as to enable a vehicle to transverse relatively rough terrain, containing relatively steep obstacles over which the vehicle wheels must climb, without stalling.

A related object of the invention is to provide a drive arrangement of the character described wherein the articulated vehicle suspension and the independent wheel drive system coact in a new and unique way to permit any one or more of the vehicle wheels to develop maximum tractive effort for traversing relatively steep obstacles in the paths of the respective wheels.

A further object to the invention is to provide a vehicle drive arrangement of the character described which is relatively simple in construction, economical to manufacture, reliable in operation, immune to malfunctioning and failure, and otherwise ideally suited to its intended purposes.

Other objects, advantages, and features of the invention will become readily evident as the description proceeds.

With these and such other objects in view, the invention consists in the construction, arrangement, and combination of the various parts of the invention, whereby the objects contemplated are attained, as hereinafter set forth, pointed out in the appended claims, and illustrated in the accompanying drawings.

In these drawings:

FIGURE 1 is a perspective view of a vehicle embodying an articulated suspension of the kind disclosed in the aforementioned Patent No. 3,266,815 and a novel drive arrangement according to the present invention;

FIGURE 2 is an enlarged side elevation of the vehicle in FIGURE 1;

FIGURE 3 is an enlarged section taken on line 3—3 in FIGURE 2;

FIGURE 4 is an enlarged side elevation of the vehicle illustrating the action of the articulated vehicle suspension during movement of one front wheel of the vehicle over an obstacle;

FIGURE 5 is a view similar to FIGURE 4 illustrating the action of the articulated vehicle suspension during movement of one front wheel and the opposite rear wheel over obstacles;

FIGURE 6 is a plan view of the articulated or flexible frame of the vehicle;

FIGURE 7 is an enlarged section taken on line 7—7 in FIGURE 6;

FIGURE 8 is an enlarged section taken on line 8—8 in FIGURE 6;

FIGURE 9 is an enlarged fragmentary perspective view of one wheel mount of the vehicle;

Figure 10:
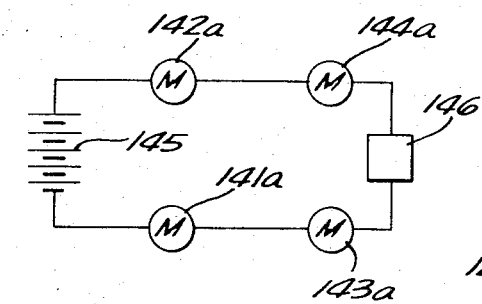
FIGURE 10 is a schematic diagram of an electrical drive system embodied in the vehicle.

Briefly, in its broader aspects, the invention provides a vehicle having a rectangular articulated or flexible frame supported on four ground engaging wheels located at the four corners of the frame. This frame has a pair of longitudinal side members, a pair of transverse end members, and corner pieces pivotally connecting the adjacent ends of the side and end members in such a way as to condition the frame for articulation involving simultaneous pivoting of the side members in opposite directions about a transverse pivot axis of the frame which is substantially coincident with the transverse centerline of the frame and simultaneous pivoting of the end members about a longitudinal pivot axis of the frame which is substantially coincident with the longitudinal centerline of the frame. Cooperatively associated with the flexible frame is a rigid frame. This rigid frame is pivotally connected to the side members on the transverse pivot axis and to the end members on the longitudinal pivot axis.

The vehicle structure thus far described constitutes the subject matter of the aforementioned Patent No. 3,266,815 and provides a torsion free, articulated vehicle suspension which is effective to maintain substantially equal loading on all four vehicle wheels and to minimize or eliminate torsional stress in the rigid frame, as well as in a pay load supported on a rigid frame, during movement of the vehicle, particularly over rough or uneven terrain. Thus, the pivotal connections between the rigid frame and the side and end members of the flexible frame permit the vehicle wheels to move vertically essentially independently of one another without disturbing the equal loading on the wheels and without creating torsional stress in the rigid frame. As a consequence, during movement of the vehicle over rough or uneven terrain, the wheels ride up and over obstacles in their paths without appreciably altering the equal load distribution on the wheels or creating torsional stress in the rigid frame.

The present invention resides in a drive arrangement for the vehicle which is uniquely constructed and arranged to cooperate with the articulated vehicle suspension in such a way as to enable the vehicle to travel over exceedingly rough or uneven terrain, containing relatively steep obstacles over which the wheels must ride, without stalling. According to the invention, the four vehicle wheels are independently driven by a novel differential drive means which is powered from an energy source on the vehicle. The drive means is uniquely constructed and arranged in such a way that when one of the wheels encounters an obstacle, all of the driving energy of the power source is delivered to that wheel, thus permitting the wheel to ride up and over the obstacle without causing stalling of the vehicle. In the preferred embodiment of the invention, for example, the differential drive means for the vehicle wheels comprises four series wound DC motors which are driveably coupled to the wheels, respectively, and are electrically connected in a series loop with a direct current electrical power source on the vehicle.

This differential drive means of the present invention coacts in a new and unique way with the vehicle suspension. Thus, the fact that the suspension permits independent vertical movement of the wheels and preserves equal load distribution on the four wheels during such vertical movement, permits each wheel to develop maximum tractive effort when encountering an obstacle, thereby permitting the wheel to climb up and over the obstacle without stalling. A further feature of the invention resides in a steering action which is embodied in the evhicle for utilization in the event both front wheels or both rear wheels encounter a relatively steep obstacle simultaneously, which condition might conceivably cause stalling of the vehicle. In this case, the steering action of the vehicle is utilized to cant the vehicle in such a way as to permit first one wheel and then the other to climb up and over their respective obstacles without stalling of the vehicle.

The vehicle 100 of the invention which has been selected for illustration in the drawings will now be described in detail. Vehicle 100 comprises a generally rectangular, articulated flexible frame 102 and a rigid frame or body 104 mounted on the flexible frame. As shown best in FIGURE 6, the longitudinal side member on the left side of the flexible frame 102 is designated as 120a, and that on the right side is 120b. The transverse member at the forward end of the flexible frame is designated as 121a and that on the rearward end as 121b. The corner pieces at the left front corner and right front corner of the flexible frame are designated as 122a and 122b, respectively, while the rear corner pieces are designated as 123a and 123b, respectively.

FIGURE 9 illustrates the structural arrangement of corner piece 123a. This corner piece will be seen to include a mutually perpendicular pair of tube stubs 124 and 125 which are disposed in the horizontal plane, having inner ends rigidly attached to each other and to a vertically extending wheel support tube 126. The side member 120a of the flexible frame 102 is of tubular form and has its rearward end rotatably received in the outer end of tube stub 124, while rearward end member 121b is also of tubular form and has its left end rotatably received in the tube stub 125. As also illustrated in FIGURE 9, a vertical rod 127 is rotatably disposed within the wheel support tube 126, having a steering rod 128 rigidly attached to its upper end, and having a fixed wheel base plate 129 rigidly supported from its lower end. The construction and arrangement of the remaining three corners of the flexible frame are the same as that just described and illustrated in FIGURE 9.

Figure 11:
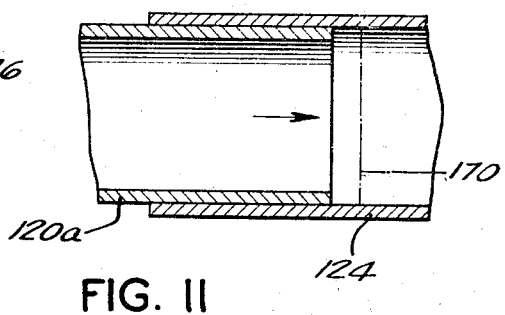
FIGURE 11 is an enlarged fragmentary section through a portion of the articulated or flexible frame of the vehicle.

The tubular construction of the flexible frame 102 is preferred for at least two reason. One reason is to reduce manufacturing cost. Another reason is that the flexible frame can be quickly and easily assembled or disassembled under field conditions. It will be noted that the side members or tubes 120a and 120b and the end members or tubes 121a and 121b are not positively locked into the corner pieces, but are retained therein by means of attachments to the rigid frame 104, as will be described. During articulation of the flexible frame 102, as the vehicle travels over uneven terrain, there is a certain amount of reciprocation back and forth of the ends of the side and end tubes within the corner pieces. This end movement is illustrated in FIGURE 11 which shows one extreme position of the end of tube 120a in solid lines, and indicates its other extreme position within the tube 124 by means of a dotted line 170.

The rigid frame 130 has a box-like construction and includes four fastening devices depending downwardly from the undersurface thereof. Fastening devices 131a and 131b are located at the longitudinal centers of the left and right sides of the rigid frame, respectively, while fastening devices 132a and 132b are located at the transverse centers of the front and rear ends of the rigid frame, respectively. Referring to FIGURE 8, which illustrates the structure of the fastening device 131a, the latter will be seen to include a short tube section 135 depending downwardly from the rigid frame 130, and L-shaped rod 136 whose upper end is disposed within the tube section 135, and a bolt 137 passing through both tube section 135 and the upper end of the rod 136 for firmly locking them together. The lower end of the rod 136 extends horizontally inwardly, beneath the rigid frame 130. This arrangement is best seen by reference to FIGURE 7 illustrating the corresponding arrangement of fastening device 131b. As seen in FIGURE 7, the inner end of rod 136 of fastening device 131b is slidably received in a sleeve member 138 which passes through opposed side openings in the tube 120b. The inner end 138a of the sleeve member is capped but its outer end 138b is open. The sleeve member 138 is rigidly fastened to the tube member 120b, as by spot welding. The end of rod 136 is inserted into the sleeve member 138 and provides a firm support which inhibits movement of the associated tube 120b in a horizontal direction outwardly from the frame 130. An inherent requirement of the present invention is that a certain amount of expansion and contraction of the flexible frame is necessary in order to achieve torsional free transportation of the load. On the other hand, if the flexible frame is completely free to expand or contract, the result would be that it would fall apart. So it is apparent that retaining means are necessary in order to prevent the structure from falling apart, while at the same time permitting the expansion and contraction movement to occur to the extent that they are necessary to fill the purpose of the invention.

As illustrated in FIGURE 7, the tube 120b has a smaller tube 120b' concentrically disposed therein, and a still smaller tube 120b'' disposed within the tube 120b'. Tube 120b' is shorter than the tube 120b, tube 120b'' is shorter than the tube 120b' and the longitudinal centers of all three tubes coincide. Thus, all three tubes are supported at their longitudinal centers by the permanently secured sleeve member 138. It will be readily seen that in this manner a spring arrangement is achieved, permitting the longitudinal center and the two ends of the side tube 120b to be flexibly supported relative to each other. In a similar manner, the tube 120a has consecutively smaller and shorter tubes 120a' and 120a'' concentrically disposed therein. The ends of these shorter tubes are indicated by appropriate dotted lines in FIGURE 6.

The four wheels or tires of the vehicle are identified as 141 for the left front, 142 for the right front, 143 for the left rear, and 144 for the right rear, respectively. The wheels or tires are mounted upon respective motor units 141a, 142a, 143a, and 144a. As shown in FIGURE 2, the motor unit 143 is supported from the corresponding fixed wheel base plate 129, and is rotatable relative thereto. The motor units are preferably of the type manufactured by the motorized wheel division of General Electric Company 2901 E. Lake Road, Erie, Pa. These motors are traction type, direct current series wound machines. A battery 145 carried in a compartment 145 furnishes the motive power for the vehicle.

Reference is now made to FIGURE 10 illustrating the arrangement of the electrical circuit. Motors 141a, 142a, 143a, and 144a are connected in a series loop circuit with each other as well as with the battery 145 and a control device 146. The advantage of the illustrated electrical drive arrangement is that driving power can be shifted from one wheel to another, whenever it is needed, without intervention of the operator. Specifically, when any one wheel of the vehicle encounters a steep obstacle, substantially all of the tractive power of the vehicle will be delivered to that particular wheel, thereby enabling it to climb up and over the obstacle. It will, of course, be understood that whereas an electrical differential drive system has been illustrated, the same character of operational results may be achieved with a differential drive system that is controlled by mechanical or hydraulic means.

Although the specific location of cables interconnecting the motor units with the control unit 146 and battery 145 has not been illustrated, it will be readily understood that they may be attached to the exterior surfaces of the side tubes or end tubes of the flexible frame, or if desired, appropriate openings may be made in the tubular frame members which may then be used as electrical conduits for receiving the necessary cables.

Figure 12:
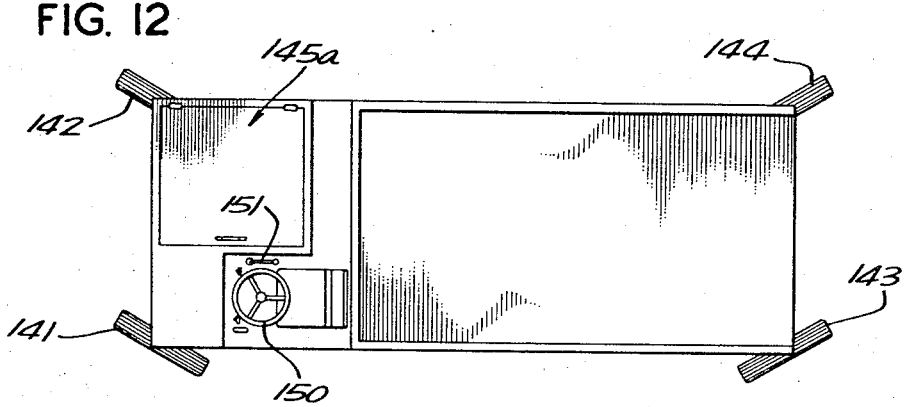
FIGURE 12 is a plan view of the vehicle illustrating a four wheel steering action embodied therein.
Figure 13:
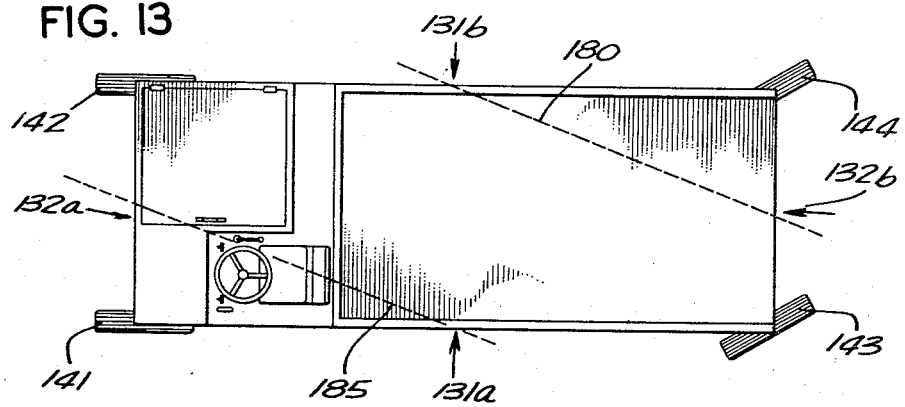
FIGURE 13 is a view similar to FIGURE 12 illustrating a two wheel steering action of the vehicle.

One unique problem which may arise in the operation of the illustrated vehicle is that which may be encountered in climbing over a wall. It is possible that both front wheels of the vehicle may engage the wall simultaneously. Tractive power is then shifted from the rear wheels to the front wheels, but is divided between the two front wheels. In order to resolve this difficulty, the vehicle is provided with rear wheel steering. By canting the rear wheels, the operator can resolve the ambiguity as to which front wheel is to climb over the wall first. It will be readily understood that the same technique may be utilized whenever obstacles are encountered by any two wheels of the vehicle simultaneously, whether by both of the front wheels, both of the rear wheels, or one front wheel and one rear wheel. To the above ends, the vehicle is provided with a front steering bar 152 and a separate rear steering bar 153, as shown best in FIGURE 6. A steering wheel 150 is utilized in conjunction with a steering shift for controlling either the front wheels as in a conventional vehicle, the rear wheels as illustrated in FIGURE 13, or both the front and rear wheels as illustrated in FIGURE 12. The specific details of the steering shift mechanism need not be illustrated nor described as they are entirely conventional and form no part of the present invention.

The climbing action of the vehicle may be best understood by reference to FIGURES 4, 5 and 13. Assuming that an obstacle encountered by the left front wheel 141, as illustrated in FIGURE 4, is 12 inches high, it will be seen that upon elevating the left front wheel 12 inches, the fastening device 131a is elevated by 6 inches, and the fastening device 132a is also elevated by 6 inches. Fastening devices 131b and 132b are not elevated at all. Referring to FIGURE 13, it will be seen that the dotted line 180 represents the common axis of the fastening devices 131b and 132b which, in the given illustration, would be neither raised nor lowered. Dotted line 185 represents the common axis of the fastening devices 131a and 132a which, in the illustration, were raised by 6 inches. It is therefore evident that upon raising the left front wheel by 12 inches, as shown in FIGURE 4, the left front corner of the rigid frame 130 of the vehicle would be raised only approximately 8 inches to 9 inches. At the same time, the right rear corner of the rigid frame, adjacent the wheel 144, would be lowered approximately 2 inches to 3 inches.

Referring now to FIGURE 5, as there illustrated the left front wheel 141 is raised by 12 inches and the right rear wheel 144 is raised by 12 inches, while the right front wheel 142 and the left rear wheel 143 remain at ground level. From FIGURE 5 and the foregoing discussion it is apparent that, under these circumstances, all of the fastening devices are raised by 6 inches, and the entire rigid frame 130 of the vehicle is elevated by 6 inches.

As noted earlier, the articulated vehicle suspension described above, including the flexible frame 120, the rigid frame 130, and the pivotal connections between these frames, constitutes the subject matter of Patent No. 3,266,815. As set forth in the latter application, a unique advantage of the suspension resides in the fact that the various wheels of the vehicle may traverse relatively high objects with a comparatively smaller vertical movement of the main frame of the vehicle. Furthermore, the amount of shift of the center of gravity of the rigid frame 130 and its pay load is minimized. Another advantage of the articulated suspension is that the vehicle wheels may rise and fall essentially independently of one another so as to ride over obstacles in their path. A further important advantage of the suspension resides in the fact that the weight of the vehicle and its pay load is substantially equally distributed between the four wheels, and this equal weight or load distribution does not change appreciably when the wheels ride over obstacles in their path. This latter advantage of the suspension is in contrast to a conventional motor vehicle spring suspension system, for example, wherein movement of any given wheel of the vehicle over a raised obstruction in its path increases the loading on that wheel, whereas movement of the wheel over a depression in the ground increases the loading on the remaining wheels.

The foregoing advantages of the articulated suspension of the vehicle 100 result in a new and unique coaction between the suspension and the differential drive system of the present invention which, in the illustrated embodiment of the invention, is the electrical differential drive system of FIGURE 10. Thus, as noted earlier, when any one wheel of the vehicle encounters a steep obstacle in its path, substantially all of the available power of the drive system is delivered to that particular wheel. When one wheel of the illustrated vehicle encounters a steep obstruction, for example, the remaining wheels may remain relatively stationary while the wheel which encounters the obstruction rides up and over the obstruction. In this case, substantially all of the available power of the battery 146 is delivered to the motor 143a which drives the wheel currently engaged with the obstruction. It is significant to note at this point that the series wound DC motors which drive the wheels of the illustrated vehicle may stall without damage to the motors, thus permitting some of the wheels to remain stationary, as just noted, while a remaining wheel rides up and over an obstruction. Further, as discussed above, the equal load distribution on the four vehicle wheels is not appreciably changed by vertical movement of the wheels. Accordingly, when any one of the wheels rides over an obstruction, the loading on that wheel remains substantially constant. As a consequence, when a wheel encounters a steep obstacle in its path, maximum tractive effort is developed at that wheel for driving the latter up and over the obstacle without stalling. As noted earlier, while this advantage of the invention is achieved, in the illustrated vehicle, by means of an electrical differential drive system, the same advantage may be attained by employing other types of differential drive systems, such as a mechanical differential drive or a hydraulic drive system embodying separate hydraulic drive motors for the wheels.

It is now obvious that the invention herein described and illustrated is fully capable of attaining the several objects and advantages preliminarily set forth. The invention has been described in considerable detail to comply with the patent laws by providing a full public disclosure of at least one of its forms. However, such detailed description is not intended in any way to limit the broad features or principles of the invention or the scope of patent monopoly to be granted.

What is claimed as new in support of Letters Patent is:
1. A rough-terrain vehicle comprising, in combination:
    a flexible rectangular frame including a pair of longitudinally extending side members, a pair of transversely extending end members, and pivotal connection at each corner of said flexible frame between one of said side members and one of said end members;
    four wheels carried by respective corners of said flexible frame and adapted to support said vehicle for longitudinal movement;
    a rigid frame;
    means pivotally connecting the longitudinal centers of each of said side and end members to corresponding separate points on said rigid frame whereby the corners of said flexible frame are permitted to move up and down;
    a source of motive power carried by said rigid frame;
    and differential drive means energizable by said source of motive power and coupled to all of said wheels for rotatably driving the same in a common direction of rotation;
    the action being such that when one of said wheels encounters a vertical obstacle said differential drive means permits all of the driving energy of said source to be delivered to said one wheel, and the associated corner of said flexible frame moves upwardly relative to said rigid frame thereby permitting said one wheel to climb vertically up and thence over said obstacle.

2. A vehicle as claimed in claim 1 in which each of said side members and each of said end members is a hollow tube, said flexible frame includes four corner pieces each having a pair of mutually perpendicular cylindrical openings therein, and an end of one of said side members and one of said end members are rotatably received in respective openings of each of said corner pieces.

3. A vehicle as claimed in claim 2 wherein said side members and end members are removably disposed in said openings of said corner pieces, and which further includes fastening means associated with said pivoting means for inhibiting excessive horizontal separation of said pair of side members or of said pair of end members.

4. A vehicle as claimed in claim 1 having means for separately steering the front and rear wheels, whereby upon encountering a vertical wall with both of the front wheels thereof simultaneously, said rear wheels may be canted in a particular direction to cause the corresponding one of said front wheels to climb said wall ahead of the other front wheel.

5. A vehicle as claimed in claim 1 wherein said source of motive power is a source of direct current electrical energy, and said differential drive means includes individual electric motors carried by respective ones of said wheels, all of said motors being connected in a series loop circuit with said source of direct current energy.

References Cited

UNITED STATES PATENTS

| 812,037 | 2/1906 | Hanson et al. | 280—104 |
| 1,439,802 | 12/1922 | Miranda | 280—104 |
| 1,745,598 | 2/1930 | Brinton | 180—45 |
| 1,866,393 | 7/1932 | Brooks | 280—91 |

FOREIGN PATENTS

| 354,808 | 8/1931 | Great Britain. |

A. HARRY LEVY, *Primary Examiner.*